3,694,387
PHENOLIC RESIN FOAMS

Hans Junger, Troisdorf, and Franz Weissenfels, Siegburg, Germany, assignors to Dynamit Nobel Aktiengesellschaft, Troisdorf, Germany
No Drawing. Filed Nov. 17, 1971, Ser. No. 199,771
Claims priority, application Germany, Nov. 28, 1970,
P 20 58 663.4
Int. Cl. C08j 1/26
U.S. Cl. 260—2.5 F           9 Claims

ABSTRACT OF THE DISCLOSURE

A resol-based phenolic resin foam having an improved resistance to heat and fire, having a density of about 20 to 200 kg./m.$^3$, a shrinkage of about 0.1 to 2.8% and the absence of any tendency to fissure upon exposure for 30 minutes to a temperature of 450° C. in a muffle furnace, the shrinkage and fissuring tests being made on foam slabs having the dimensions 250 mm. x 130 mm. x 30 mm. The foam is produced by including in a liquid phenol-resol resin having a solid resin content of about 60 to 85% by weight about 2 to 30% by weight based on the resin, of a normally hydrocarbon liquid. Boric acid may also be included in the mix which also contains an acid hardening agent and a gas foaming agent which releases a gas or is a low-boiling organic solvent.

---

This invention relates to the production of improved phenolic resin foams which are charatcerized by low shrinkage and greatly reduced fissuring tendency when exposed to elevated temperatures.

It is known to make phenolic resin foams in open or closed molds from mixtures consisting of liquid phenolic resins of the resol type containing 60–85% by weight of solid resin, solid or fluid foaming agents, pulverulent or liquid hardeners and small quantities of surface-active chemicals.

Compared to other synthetic resin foams, phenolic resin foams retain their shape well at elevated temperatures, are difficultly inflammable and are used as insulating materials in a temperature range up to approximately 130° C. Even when exposed to higher temperatures of heat or flames, phenolic resin foams do not melt or soften. If the foam is subjected to the action of flame with simultaneous heavy air or oxygen supply, the foam may burn completely.

In the temperature range between 70 and 130° C. phenolic resin foams have a shrinkage of only 1–3% on long-term exposure. On exposure to higher temperatures, e.g. 200–700° C., phenolic resin foam slabs are subject to substantially increasing shrinkage and increasing coking with rising temperature; eventually a foam skeleton will form consisting predominantly of carbon, which also has good resistance to heat and flames.

The burning characteristics of phenolic resin foams made according to known methods, which in itself are favorable, may however be affected considerably in two ways:

(1) As a result of shrinkage, which amounts to 4–15% in the temperature range of 200–700° C., gaps may for instance form between the slabs assembled to provide a surface area, which in turn constitute heat or fire bridges.

(2) Upon exposure to more than 200° C., phenolic resin foams, in particular slabs, show a marked tendency to form fissures, which constitute heat bridges and via which the spreading of a fire may also be facilitated.

It is known to add boron compounds, e.g. boric acid, to phenolic resin foams to increase their resistance to fire. A similar addition markedly reduced the burning rate of phenolic resin foams upon direct exposure to fire.

Surprisingly it has now been found that additions of one or more paraffin-based, naphthene-based, aromatic or mixed-based hydrocarbons and, under certain circumstances, olefinically unsaturated hydrocarbons, to the foamable phenolic resin mixtures result in foams, which, in the range between 200 and 700° C., have even more favorable temperature resistance than the known foams improved by adding boric acid; the hydrocarbons employed are liquid at room temperature and up to a pressure of 11 atmospheres absolute and have flash points (according to DIN 51 584) of more than 150° C. It is especially surprising that the foams produced with said hydrocarbons exhibit a considerable improvement in fissuring upon exposure to the indicated temperature. At the same time, both shrinkage and the burning rate are markedly reduced compared to the properties of hitherto-known phenolic resin foams.

The same favorable results are obtained when the aforementioned hydrocarbons are added at the very outset to the liquid phenolic resins which are used as starting materials for the foamable phenolic resin mixture or phenolic resin foams.

More specifically, the phenol-resol resins to be foamed have a solid resin content of about 60 to 85%, preferably about 70 to 80% by weight. There may be present known modifying agents, preferably fire protecting agents, the hardening being realized by means of acids and, if desired, additional heat. The hydrocarbon is preferably added to the extent of 2 to 30%, preferably 2 to 10% by weight, based on the phenolic resin used.

In particular, mineral oils and selective extracts are among the hydrocarbons used in accordance with the invention. The selective extracts are mainly products from certain petroleum fractions to the extent that they have the aforementioned physical properties. The hydrocarbons used in accordance with the invention may have carbon contents ranging from about 81 to 88% and hydrogen contents varying between about 8 and 16%. Generally, they also contain small quantities of oxygen, sulfur, nitrogen and other elements.

Basically, according to the invention, those technical mixtures of higher hydrocarbons may also be used to the extent that they have the aforementioned properties, even if they are of different origin, e.g. from low-temperature carbonizing oils or synthetically produced hydrocarbons.

The foams are produced according to methods known in the art, the only difference being that the special hydrocarbons are added in accordance with the invention. As is known, phenolic resins of the resol type are used for the production of phenolic resin foams. These phenolic resins are produced for instance by condensing 1 mole of a phenol with about 1 to 3 moles of aldehydes in an alkaline medium, subsequently distilling off the water in a vacuum to obtain a solid resin content of about 60 to 85%, preferably about 70 to 80% by weight, and, if desired, adjusting the pH-value to more than about 4. As phenols both phenol and its homologues, such as cresols and xylenols, or mixtures of these compounds, may be used. The aldehydes reacting with the phenols comprise, for example, formaldehyde, acetaldehyde, furfural, compounds decomposing to formaldehyde, such as paraformaldehyde, hexamethylenetetramine, and others, as well as mixtures of these compounds. In most cases the condensation is carried out in an aqueous alkaline medium. According to the invention phenol-resol resins of phenol and formaldehyde are preferably used.

The liquid phenolic resins obtained in this manner are mixed with the usual additives such as liquid or solid hardeners, surface-active substances and foaming agents. According to the invention, the special hydrocarbons and, if desired, fire protective agents are also added. Following intimate blending of all components foaming and hardening is carried out in open or closed molds. In this operation the foaming agents pass over into the gaseous state. Depending on the composition of the blend to be foamed, the foaming operation takes place at temperatures between about 10° and 100° C., preferably between about 20 and 80° C. The foam articles obtained correspond to the molds chosen.

The compounds used as foaming agents comprise both those compounds from which inert gases, preferably carbon dioxide, are released under reaction conditions such as the alkali carbonates and bicarbonates, as well as low-boiling organic solvents. Liquid foaming agents comprise low-boiling organic solvents, such as n-pentane or gasoline fractions boiling within the range of about 25 to 70° C., chlorofluoromethane, and the like. The liquid foaming agents are added in quantities varying between about 1.0 and 20.0 by weight based on the phenol/resol resin.

As hardeners both liquid and pulverulent substances may be utilized. The quantity required partially depends on the foaming agent used. If the foaming agent consists of a solid salt which evolves gases, part of the acid is used to release the gases. If low-boiling solvents are employed as foaming agent, the proportion of hardener is lower in accordance therewith. In addition to mineral acids such as HCl, $H_2SO_4$ and the like, water-soluble sulfonic acids are particularly well suited as water-soluble acids, i.e. those sulfonic acids where the sulfonic acid group is directly linked to an aromatic ring which may be substituted. Examples thereof include benzene sulfonic acid, p-toluene sulfonic acid, phenol sulfonic acid, cresol sulfonic acid, and the like. The aqueous solutions of these acids are mainly utilized as 40 to 70% by weight solutions. Some acids, such as p-toluene sulfonic acid, may also be used in the pulverulent foam as hardener. The quantity of the hardener used varies between about 1 and 15% by weight, calculated as 100% acid, based on phenol-resol resin.

The surface-active agents are utilized in quantities of about 0.4 to 10%, preferably about 1 to 5% by weight, based on the phenolic resin. Known surface-active agents include oxyethylated castor oil and polyethylene ethers of long-chain fatty acid monoesters of sorbitol. As fire protective agent the addition of about 5 to 30% boric acid, if desired mixed with oxyethylated phenols, has proven of value.

It is also possible to carry out the foaming process continuously, e.g. in a double conveyer molding press. In this operation the components are dosed and blended by means of known automatic dosing and blending devices, and the mixture is fed continuously onto the conveyers of a double conveyer molding press by means of a feeding device moving transversely to the movement of the conveyers. Thereupon the mixture is guided through a clearance of adjustable thickness formed by a roller on one side and a support on the other. The roller may be preheated. In this process, slabs of predetermined variable thickness are obtained.

The foaming and hardening process is preferably carried out in an oven and is generally controlled in such a way that, as soon as the desired foaming volume is attained, the foam structure is solidified to such a point that it will no longer collapse.

The novel phenolic resol resin foams, possibly containing boric acid, are characterized by improved resistance to the effects of heat and/or fire, by a density of approximately 20 to 200 kg./m.³, preferably approximately 30 to 100 kg./m.³, a shrinkage of about 0.1 to 2.8%, preferably about 0.3 to 1.5%, as a result of exposure for 30 minutes to a temperature of 450° C. in a muffle furnace and the absence of any tendency to fissure under such conditions, the shrinkage and fissuring tests being made on foam slabs having the dimensions 250 mm. x 130 mm. x 30 mm.

The phenolic resin foams according to the invention represent a valuable contribution to the advance of industrial techniques. They are, for instance much more efficient heat insulating materials at elevated temperatures, in particular at temperatures, up to 450° C., than the conventional phenolic resin foams. Due to the absence of fissuring and the reduced shrinkage the favorable insulating effect remains largely intact at these temperatures and also upon exposure to fire.

The invention will be further described in the following illustrative examples.

EXAMPLES 1 TO 16

(A) Preparation of the liquid phenol-resol resin

The phenolic resin used in all tests described below was prepared as follows:

143 parts by weight of phenol were condensed with 243 parts by weight of a 30% by weight aqueous formaldehyde solution for 50 minutes at 100° C. in the presence of 4.3 parts by weight of sodium hydroxide in 4.3 parts by weight of water. The reaction mixture produced was distilled in a vacuum to a solid resin content of 70 to 75% by weight and subsequently mixed with 3% by weight of oxyethylated castor oil as cell controlling agent. The resin produced in this manner had a viscosity of 3,000 to 5,000 centipoise at room temperature. In all cases the viscosity was determined using the falling-ball viscosimeter according to Höppler.

(B) Mixture components of the phenol-resol resin

For the preparation of the foams the following hardeners were used:

Hardener I 100 parts by wt. of glycol
100 parts by wt. of hydrochloric acid (37%)

Hardener II 30 parts by wt. of p-toluene sulfonic acid
30 parts by wt. of $H_2SO_4$
40 parts by wt. of water n-Pentane was used as foaming agent, finely powdered boric acid was used as fire protective agent.

The three hydrocarbons characterized below were used as paraffin-based, naphthene-based, aromatic or mixed-based hydrocarbons:

Oil A

Density (at 15° C.): 0.995.
Flash point (according to DIN 51 584): 190° C.
Viscosity at 20° C.: 440 centipoise.
Refractive index $n_D^{20}$: 1.5542.
C content: 85.4%.
H content: 9.4%.
Oil type: selective extract.

Oil B

Density (at 20° C.): 0.878.
Viscosity at 20° C.: 60 centipoise.
Flash point: 180° C.
Refractive index $n_D^{20}$: 1.4718.
C content: 86.1%.
H content: 13.9%.
Oil type: paraffin oil.

Oil C

Density (at 15° C.): 0.960.
Viscosity (at 20° C.): 18,000 centipoise.
Flash point: 305° C.
Refractive index $n_D^{20}$: 1.5230.
C content: 85.2%.
H content: 12.1%.
Oil type: superheated steam cylinder oil.

(C) Production and testing of the foams

According to Examples 1 to 16 the phenolic resin in the individual tests was mixed with the quantities of the hardeners I or II, n-pentane as well as boric acid, if desired, and the different mineral oils are stated in the table below wherein all volume and wt. percent data refer to the liquid phenolic resin. The foaming and hardening operation was realized by pouring the intimate blend of the components into open box molds having a base area of 50 x 50 cm. and a height of 100 cm. The material was foamed while supplying warm air (50°) with simultaneous increasing solidification within 70 minutes. At the end of about 120 minutes the hardened foam blocks could be removed from the mold.

The foam obtained in this manner was tested for shrinkage and fissuring due to exposure to high temperatures by using slabs which had the dimensions 250 x 130 x 30 mm. and were cut from the raw blocks. In these tests the samples were placed on several glass rods in a muffle furnace with their longitudinal edge reting on these rods and exposed to a temperature of 450° C. for 30 minutes. Thereupon the samples were taken out of the muffle furnace and left to cool in a desiccator.

The shrinkage was determined by measuring the length and width of the samples. Fissure formation of the samples was evaluated visually. The results of the tests can be seen from the table wherein the data listed are the minimum and maximum values for 5 tests each.

With respect to the evaluation of the test results it should be borne in mind that, in the case of samples with a large degree of fissuring, the measuring shrinkage values might possibly have been lower than was actually the case because a large amount of fissures can under certain circumstances simulate an expansion which will reduce the observed shrinkage.

2. Process according to claim 1, wherein the hydrocarbon has a carbon content of about 81 to 88% and a hydrogen content of about 8 to 16% by weight.

3. Process according to claim 1, wherein there is included in the mix undergoing foaming about 10 to 30% of boric acid as a fire retardant, based on the weight of the phenol-resol resin.

4. Process according to claim 1, wherein the solid resin content of the liquid phenol-resol resin is about 70 to 80% by weight.

5. Process according to claim 1, wherein the hydrocarbon is present in about 2 to 10% by weight of the phenolic resin.

6. Process according to claim 2, wherein the solid resin content of the liquid phenol-resol resin is about 70 to 80% by weight and the hydrocarbon is present in about 2 to 10% by weight of the phenolic resin, the mix undergoing foaming including about 10 to 30% of boric acid as a fire retardant, based on the weight of the phenol-resol resin.

7. A resol-based phenolic resin foam containing about 2 to 30% by weight based on the phenolic resin used, of a paraffin-based, naphthene-based, aromatic or mixed-based hydrocarbon or an olefinically unsaturated hydrocarbon, which hydrocarbon is liquid at room temperature and a pressure up to 11 atmospheres absolute and has a flash point of more than 150° C., said foam having an improved resistance to heat and fire, having a density of about 20 to 200 kg./m.$^3$ a shrinkage of about 0.1 to 2.8% and the absence of any tendency to fissure upon exposure for 30 minutes to a temperature of 450° C. in a muffle furnace, the shrinkage and fissuring tests being made on

TABLE

| Example number | Foam composition ||||||| Foam properties |||
|---|---|---|---|---|---|---|---|---|---|
| | Phenolic resin, kg. | n-Pentane, vol. percent | Hardener || Boric acid, wt. percent | Mineral oil || Density, kg./m.$^3$ | Shrinkage, percent (30 minutes at 450° C.) | Fissuring (30 minutes at 450° C.) |
| | | | Type | Vol. percent | | Type | Wt. percent | | | |
| 1 | 20 | 8 | I | 10 | | | | 53 | 3.5-5.6 | Fissuring. |
| 2 | 20 | 6 | II | 10 | | | | 51 | 6.1-8.3 | Marked fissuring. |
| 3 | 20 | 12 | I | 10 | 20 | | | 57 | 1.2-2.9 | Light fissuring. |
| 4 | 20 | 10 | II | 10 | 20 | | | 59 | 1.3-1.8 | Fissuring. |
| 5 | 20 | 8 | II | 10 | | A | 5 | 52 | 0.4-1.5 | No fissuring. |
| 6 | 20 | 10 | II | 10 | | A | 10 | 55 | 0.7-1.2 | Do. |
| 7 | 20 | 12 | II | 10 | | A | 15 | 56 | 0.5-1.9 | Isolated hairline fissures. |
| 8 | 20 | 15 | II | 10 | | A | 20 | 58 | 0.8-2.3 | Do. |
| 9 | 20 | 10 | I | 10 | | A | 5 | 56 | 1.6-2.7 | No fissuring. |
| 10 | 20 | 14 | I | 10 | | A | 10 | 59 | 1.4-2.8 | Isolated hairline fissures. |
| 11 | 20 | 14 | I | 10 | 20 | A | 5 | 55 | 0.5-1.2 | No fissuring. |
| 12 | 20 | 12 | II | 10 | 20 | A | 5 | 54 | 0.3-0.8 | Do. |
| 13 | 20 | 10 | II | 10 | 20 | B | 5 | 53 | 0.7-1.3 | Do. |
| 14 | 20 | 11 | II | 10 | 20 | C | 5 | 50 | 1.0-2.4 | Isolated hairline fissures. |
| 15 | 20 | 9 | II | 10 | 20 | A | 10 | 56 | 0.8-1.1 | No fissuring. |
| 16 | 20 | 13 | II | 10 | 20 | A | 20 | 58 | 0.7-1.5 | Do. |

It will be appreciated that the instant specification and examples are set forth by way of illustration and not limitation, and that various modifications and changes may be made without departing from the spirit and scope of the present invention.

What is claimed is:

1. In the production of phenolic resin foams by foaming and hardening with acid a liquid phenol-resol resin having a solid resin content of about 60 to 85% by weight, the improvement which comprises incorporating in the mix undergoing foaming about 2 to 30% by weight based on the phenolic resin used, of a paraffin-based, naphthene-based, aromatic or mixed-based hydrocarbon or an olefinically unsaturated hydrocarbon, which hydrocarbon is liquid at room temperature and a pressure up to 11 atmospheres absolute and has a flash point of more than 150° C., whereby the resulting foam has a reduced tendency to shrink and form fissures upon exposure to elevated temperatures.

foam slabs having the dimensions 250 mm. x 130 mm. x 30 mm.

8. A foam according to claim 7, having a density of about 30 to 100 kg./m.$^3$ and a shrinkage of about 0.3 to 1.5%.

9. A foam according to claim 8, including about 10 to 30% of boric acid based on the weight of the phenol-resol resin.

References Cited

UNITED STATES PATENTS 3,267,048   8/1966   Horste et al. _____ 260—2.5 F

MURRAY TILLMAN, Primary Examiner

M. FOELAK, Assistant Examiner

U.S. Cl. X.R.

260—2.5 FP, 33.6 R, 59